United States Patent
Sutton, Jr. et al.

(10) Patent No.: US 7,325,249 B2
(45) Date of Patent: Jan. 29, 2008

(54) IDENTIFYING UNWANTED ELECTRONIC MESSAGES

(75) Inventors: Lorin R. Sutton, Jr., Winchester, VA (US); Craig E. Despeaux, Reston, VA (US); Michael K. Adamski, Marshall, VA (US)

(73) Assignee: AOL LLC, Dulles, VA (US)

( * ) Notice: Subject to any disclaimer, the term of this patent is extended or adjusted under 35 U.S.C. 154(b) by 1031 days.

(21) Appl. No.: 10/059,147

(22) Filed: Jan. 31, 2002

(65) Prior Publication Data

US 2002/0162025 A1   Oct. 31, 2002

Related U.S. Application Data

(60) Provisional application No. 60/286,963, filed on Apr. 30, 2001.

(51) Int. Cl.
*G06F 17/00* (2006.01)
(52) U.S. Cl. .................. 726/13; 713/188; 709/206; 709/207
(58) Field of Classification Search ........ 726/206–207; 709/24
See application file for complete search history.

(56) References Cited

U.S. PATENT DOCUMENTS

| | | | |
|---|---|---|---|
| 4,206,315 A | 6/1980 | Matyas et al. | |
| 5,202,890 A | 4/1993 | Iketani et al. | |
| 5,327,486 A | 7/1994 | Wolff et al. | |
| 5,533,110 A | 7/1996 | Pinard et al. | |
| 5,557,659 A | 9/1996 | Hyde-Thomson | |
| 5,572,246 A | 11/1996 | Ellis et al. | |
| 5,583,920 A | 12/1996 | Wheeler, Jr. | |
| 5,793,365 A | 8/1998 | Tang et al. | |
| 5,872,917 A | 2/1999 | Hellman | |
| 5,878,219 A | 3/1999 | Vance, Jr. et al. | |
| 5,937,160 A | 8/1999 | Davis et al. | |
| 5,960,411 A | 9/1999 | Hartman et al. | |
| 5,978,791 A | 11/1999 | Farber et al. | |
| 6,006,228 A | 12/1999 | McCollum et al. | |

(Continued)

FOREIGN PATENT DOCUMENTS

EP    08 51355    7/1998

(Continued)

OTHER PUBLICATIONS

Japaneese Application (PAJ) 2002-163341.*

(Continued)

*Primary Examiner*—Kambiz Zand
*Assistant Examiner*—Peter Poltorak
(74) *Attorney, Agent, or Firm*—Fish & Richardson P.C.

(57) ABSTRACT

An unwanted message may be identified by inspecting the payload portion of a message being communicated, comparing the characteristics of the payload portion with stored data indicating characteristics of other messages, and identifying a security condition based on a comparison of the message inspected. The characteristics inspected may include the payload portion of a message or the whole message when the characteristics are being compared against messages being exchanged on more than one local exchanging system. Furthermore, the characteristics of messages may be tracked for comparison against the characteristics of future messages. A threshold number of those characteristics may subsequently implicate a hostile security condition, even if a current comparison of these characteristics does not reach the threshold necessary to implicate a hostile security condition.

27 Claims, 6 Drawing Sheets

U.S. PATENT DOCUMENTS

| | | | |
|---|---|---|---|
| 6,012,051 A | 1/2000 | Sammon, Jr. et al. | |
| 6,014,638 A | 1/2000 | Burge et al. | |
| 6,018,774 A | 1/2000 | Mayle et al. | |
| 6,026,403 A | 2/2000 | Siefert | |
| 6,052,709 A * | 4/2000 | Paul | 709/202 |
| 6,058,428 A | 5/2000 | Wang et al. | |
| 6,076,111 A | 6/2000 | Chiu et al. | |
| 6,085,249 A | 7/2000 | Wang et al. | |
| 6,097,389 A | 8/2000 | Morris et al. | |
| 6,104,990 A | 8/2000 | Chaney et al. | |
| 6,151,584 A | 11/2000 | Papierniak et al. | |
| 6,161,130 A * | 12/2000 | Horvitz et al. | 709/206 |
| 6,202,061 B1 | 3/2001 | Khosla et al. | |
| 6,266,692 B1 * | 7/2001 | Greenstein | 709/206 |
| 6,330,590 B1 * | 12/2001 | Cotten | 709/206 |
| 6,353,848 B1 | 3/2002 | Morris | |
| 6,356,937 B1 | 3/2002 | Montville et al. | |
| 6,393,465 B2 | 5/2002 | Leeds | |
| 6,438,597 B1 | 8/2002 | Mosberger et al. | |
| 6,477,544 B1 | 11/2002 | Bolosky et al. | |
| 6,519,703 B1 * | 2/2003 | Joyce | 726/22 |
| 6,523,115 B1 | 2/2003 | Ono et al. | |
| 6,584,564 B2 | 6/2003 | Olkin et al. | |
| 6,640,301 B1 | 10/2003 | Ng | |
| 6,654,787 B1 * | 11/2003 | Aronson et al. | 709/206 |
| 6,691,156 B1 | 2/2004 | Drummond et al. | |
| 6,701,440 B1 * | 3/2004 | Kim et al. | 726/24 |
| 6,714,982 B1 | 3/2004 | McDonough et al. | |
| 6,725,381 B1 | 4/2004 | Smith et al. | |
| 6,745,936 B1 | 6/2004 | Movalli et al. | |
| 6,763,462 B1 * | 7/2004 | Marsh | 713/188 |
| 6,766,352 B1 | 7/2004 | McBrearty et al. | |
| 6,772,196 B1 | 8/2004 | Kirsch et al. | |
| 6,799,352 B2 | 10/2004 | Gilchrist et al. | |
| 7,072,942 B1 * | 7/2006 | Maller | 709/206 |
| 7,092,992 B1 * | 8/2006 | Yu | 709/206 |
| 7,149,778 B1 * | 12/2006 | Patel et al. | 709/206 |
| 2002/0099938 A1 | 7/2002 | Spitz | |
| 2002/0116508 A1 | 8/2002 | Khan et al. | |
| 2002/0124170 A1 | 9/2002 | Johnson, Jr. | |
| 2003/0056100 A1 | 3/2003 | Beatson | |
| 2003/0095527 A1 | 5/2003 | Shanbhag | |
| 2004/0039912 A1 | 2/2004 | Borrowman et al. | |
| 2004/0139327 A1 | 7/2004 | Brown et al. | |
| 2004/0181462 A1 * | 9/2004 | Bauer et al. | 705/26 |
| 2004/0255120 A1 | 12/2004 | Botti et al. | |
| 2006/0095527 A1 | 5/2006 | Malik | |

FOREIGN PATENT DOCUMENTS

| | | |
|---|---|---|
| EP | 09 82927 | 3/2000 |

OTHER PUBLICATIONS

"AOL technology: turning complicated things into engaging services," 1996 Annual Report, 22 pgs.

"YAHOO! Messenger Makes the World a Little Smaller, More Informed," pp. 1-2, Jun. 21, 1999.

Alan Cohen, "Instant Messaging," Apr. 13, 1999, PC Magazine, PC Labs, 2 pgs.

"AOL Instant Messenger Windows Beta Features," Jun. 24, 1999, 2 pgs.: AOL Instant Messenger All New Version 2.0, 2 pgs., Jun. 24, 1999; What is AOL Instant Messenger, 3 pgs, Jun. 24, 1999; Quick Tips for Getting Started, 5 pgs., Jun. 24, 1999; Frequently Asked Questions About AOL Instant Messenger, 6 pgs. Jun. 24, 1999.

* cited by examiner

IDENTIFYING UNWANTED ELECTRONIC MESSAGES

CROSS-REFERENCE TO RELATED APPLICATIONS

This application claims the benefit of U.S. Provisional Application No. 60/286,963 filed Apr. 30, 2001, which is incorporated by reference.

TECHNICAL FIELD

This invention relates to the identification of unwanted electronic messages in a message exchanging system.

BACKGROUND

Through the exchange of electronic messages, a new medium of communication has evolved. As this new communication medium has become more pervasive, growth has been experienced both in the electronic networks supporting electronic messages and the number of people having access to those electronic networks. With this growth, message exchangers have been subject to an increasing number of spam and other unwanted messages, as well as hacker attacks through electronic messaging.

SUMMARY

In one general aspect, the performance of a message exchanging system may be improved. A payload portion of a message being communicated is inspected and characteristics of the payload portion are identified and compared with stored data indicating characteristics of at least one other message that has been inspected. A security condition is identified based on the comparison.

In another general aspect, the performance of a message exchanging system may be improved by inspecting a message being communicated to a first device in a message exchanging system of two or more devices and identifying characteristics of the message. Characteristics of the message are compared with stored data indicating characteristics of at least one other message communicated to a second device, and a security condition is identified based on the comparison.

Implementations may include one or more of the following features. For example, the characteristics of the payload portion include information other than address information. The characteristics of the payload portion inspected do not include address information. The message exchanged may include an electronic mail message.

The characteristics may be tracked for comparison against characteristics of future messages, and the characteristics of a new message may be compared with the characteristics of at least one message that has been tracked. Comparing characteristics may include comparing characteristics with stored characteristics of other communicated messages.

Implementations may include rejecting the message if the security condition identified includes a hostile indicator. The hostile indicator may be revealed as a hostile indicator when comparing characteristics of the messages inspected reveals a threshold of messages having a shared characteristic.

The security condition may include an indeterminate indicator. Implementations may include determining that the security condition includes an indeterminate indicator when the characteristics, standing alone, do not reveal a hostile security condition, but the characteristics may do so in combination with similar characteristics of other messages, including those exchanged in the future. Implementations may include removing messages with these characteristics if these characteristics subsequently generate a hostile indicator for a security condition. The message may be accepted if the security condition includes an indeterminate indicator.

Implementations may include generating a neutral indicator for the security condition. If the security condition includes a neutral indicator, the message exchanging system may accept the message.

Implementations also may include inspecting messages sent or received by more than a single device.

Implementations may include a system capable of achieving the above features, for instance, a remote exchanging system, a local exchanging system, and a network between these components. Implementations also may include rearranging the sequence of steps performed on the local exchanging system to achieve these features.

The details of one or more implementations are set forth in the accompanying drawings and the description below. Other features, and advantages will be apparent from the description and drawings.

DESCRIPTION OF DRAWINGS

Like reference symbols in the various drawings indicate like elements.

DETAILED DESCRIPTION

For illustrative purposes, FIGS. 1-6 describe message exchanging systems and processes capable of determining whether an electronic message being communicated is unwanted. Generally, a message exchanging system inspects an exchanged message by determining one or more characteristics of the message and comparing them to one or more characteristics found in other messages. Based on this comparison, a security condition may be identified, and a responsive action taken. For instance, the message may be discarded if the security condition is deemed hostile. The message may be accepted if the security condition is deemed neutral or better, or the message may be tracked if the security condition is deemed indeterminate to enable responsive action based on future or other comparisons involving the characteristics of this or another exchanged message.

Figure 1:
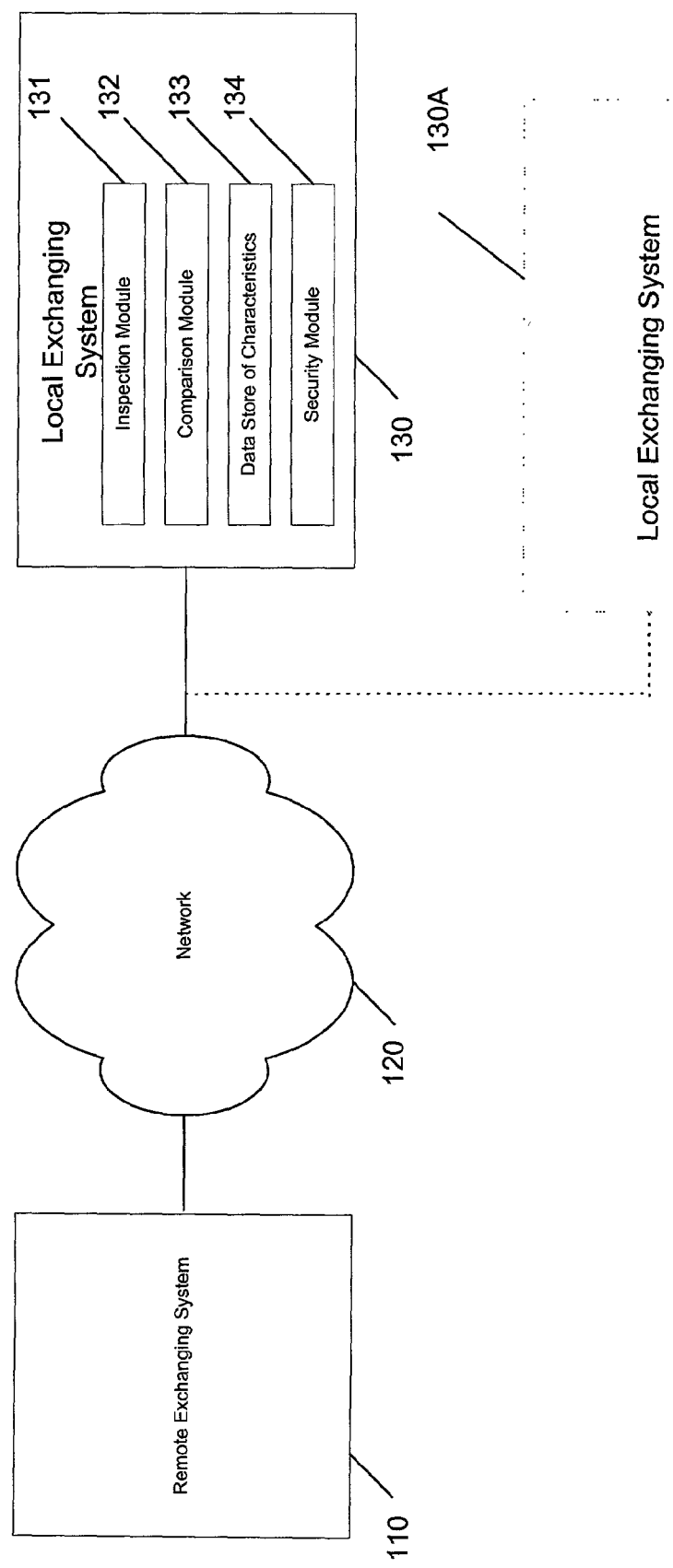
FIG. 1 is a diagram of a message exchanging system with the ability to examine exchanged messages for unwanted messages.

Referring to FIG. 1, a message exchanging system 100 may be structured and arranged to transmit messages between a remote exchanging system 110 and a local exchanging system 130 through a network 120. For brevity, each of these elements is represented as a monolithic entity. However, any or all of system 110, the network 120 and the system 130 may include numerous interconnected computers and components designed to perform a set of specified operations and/or dedicated to a particular geographical region.

Typically, the remote exchanging system 110 and the local exchanging system 130 are structured and arranged to exchange one or more messages across network 120. Each of the remote exchanging system 110 and the local exchanging system 130 may be implemented by a general-purpose computer capable of responding to and executing instructions in a defined manner. Each of the remote exchanging system 110 and the local exchanging system 130 may include a personal computer, a special-purpose computer, a workstation, a server, a device, a component, other equipment or some combination thereof capable of responding to and executing instructions. Each may be structured and arranged to receive instructions from, for example, a software application, a program, a piece of code, a device, a computer, a computer system, or a combination thereof, which independently or collectively directs operations, as described herein. The instructions may be embodied permanently or temporarily in any type of machine, component, equipment, storage medium, or propagated signal that is capable of being delivered to the remote exchanging system 110 or the local exchanging system 130.

One example of the remote exchanging system 110 includes a dedicated mailing system. Such a dedicated mailing system may be implemented by specialized hardware or executed by a general purpose processor capable of running various applications such as electronic mailer programs, either or both being capable of employing various message transfer protocols such as SMTP ("Simple Mail Transfer Protocol"). In addition or as an alternative, the remote exchanging system 110 may include a communications interface (not shown) in an information delivery network. For example, the remote exchanging system 110 may include an electronic mail gateway.

In any event, the remote exchanging system 110 generally communicates with the local exchanging system 130 using network 120. As such, the network 120 typically is structured and arranged to enable direct or indirect communications between the remote exchanging system 110 and the local exchanging system 130.

Examples of the network 120 include the Internet, the World Wide Web, one or more WANs ("Wide Area Networks"), one or more LANs ("Local Area Networks"), one or more analog or digital wired or wireless telephone networks (e.g., PSTN ("Public Switched Telephone Network"), ISDN ("Integrated Services Digital Network"), or xDSL ("Digital Subscriber Loop") network), a radio, a television, a cable, a satellite, and/or other delivery mechanisms for carrying data. The network 120 may include a direct link between the remote exchanging system 110 and the local exchanging system 130, or the network 120 may include one or more networks or subnetworks between them. Each network or subnetwork may include, for example, a wired or wireless data pathway capable of carrying and receiving data between remote exchanging system 110 and local exchanging system 130.

Typically, the local exchanging system 130 is structured and arranged to exchange one or more messages with remote exchanging system 110 across network 120. The local exchanging system 130 may include or form part of an information delivery system, such as, for example, an electronic mail system, the World Wide Web, or an online service provider network. The local exchanging system 130 is structured and arranged to receive one or more messages.

The local exchanging system 130 may include various components, including one or more of an inspection module 131, a comparison module 132, a data store of characteristics 133, and a security module 134, as illustrated by FIG. 1. In general, each of the modules and data store 133 may be independently or collectively implemented by, for example, a general-purpose computer.

The inspection module 131 may be structured and arranged to exchange and analyze a message or one or more characteristics of the message or its payload portion when communicated with one or more devices, such as another local exchanging system 130A.

The comparison module 132 may be structured and arranged to compare the characteristics of the payload portion of the inspected message with a data store of characteristics 133 or to compare the characteristics of messages exchanged across more than one device with a data store of characteristics 133.

The data store 133 may be structured and arranged to include a compilation of suspect message characteristics identified as potentially problematic, suspicious or profile-matching. Examples of such characteristics include, but are not limited to, the existence or attributes of text, a key word, a name, a physical size and/or content of an attached file, and the address of hyper text embedded in a message. When messages exchanged across more than one device are inspected, and collectively used to identify unwanted or suspect messages, characteristics stored in data store 133 also may include an IP address, a sender identification and domain name information (e.g., name.com).

Implementations of the data store 133 may include database software structured and arranged to manage information relating to characteristics of the messages. For example, the database software may keep a table of entries or terms that the local exchanging system 130 is inspecting and tracking. Each entry may include a counter indicating the number of times the entry has appeared. The entry also may include a location parameter including addresses or message identifiers indicating messages in which the entry appears. Referencing this location parameter enables retrieval of messages subsequently determined to be unwanted.

The security module 134 may be structured and arranged to identify a security condition based on results from the comparison module 132.

Although described above with respect to a single local exchanging system 130, the message exchanging system 100 may include more than one local exchanging system 130 structured and arranged to communicate messages, as depicted by local exchanging system 130A in FIG. 1. For example, an organization may use multiple servers capable of exchanging messages and may distribute messages to be communicated across the multiple servers in a manner that balances the load.

Figure 2:
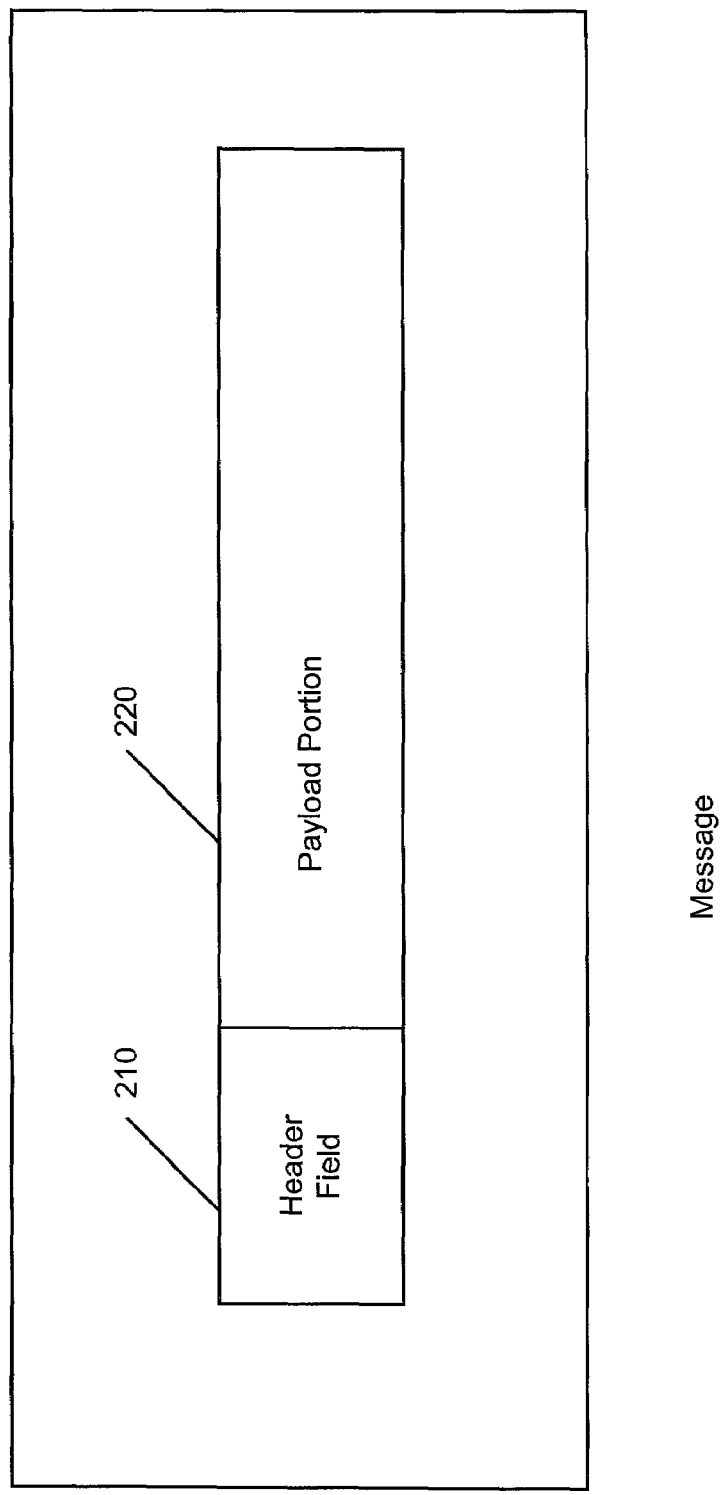
FIG. 2 is a diagram of an exemplary structure of message that may be exchanged in a communications system such as that shown in FIG. 1.

FIG. 2 shows an exemplary structure of a message 200 of the type exchanged in FIG. 1. In general, the message 200 may include, e.g., an electronic mail message and a file attachment. The message 200 may be structured and arranged to include a header field 210 and a payload portion 220. The header field 210 typically includes addressing information to describe the destination of the message. The header field 210 may include an IP address, a mail recipient identifier, a PC identifier, and/or an online identity. The payload portion 220 typically includes information other than address or identification information, such as information to be communicated to the person or system identified by the header field 210. For instance, the payload portion field 220 may include a letter in an electronic mail message, an attached file in an electronic mail message, or a hypertext link in a file.

Figure 3:
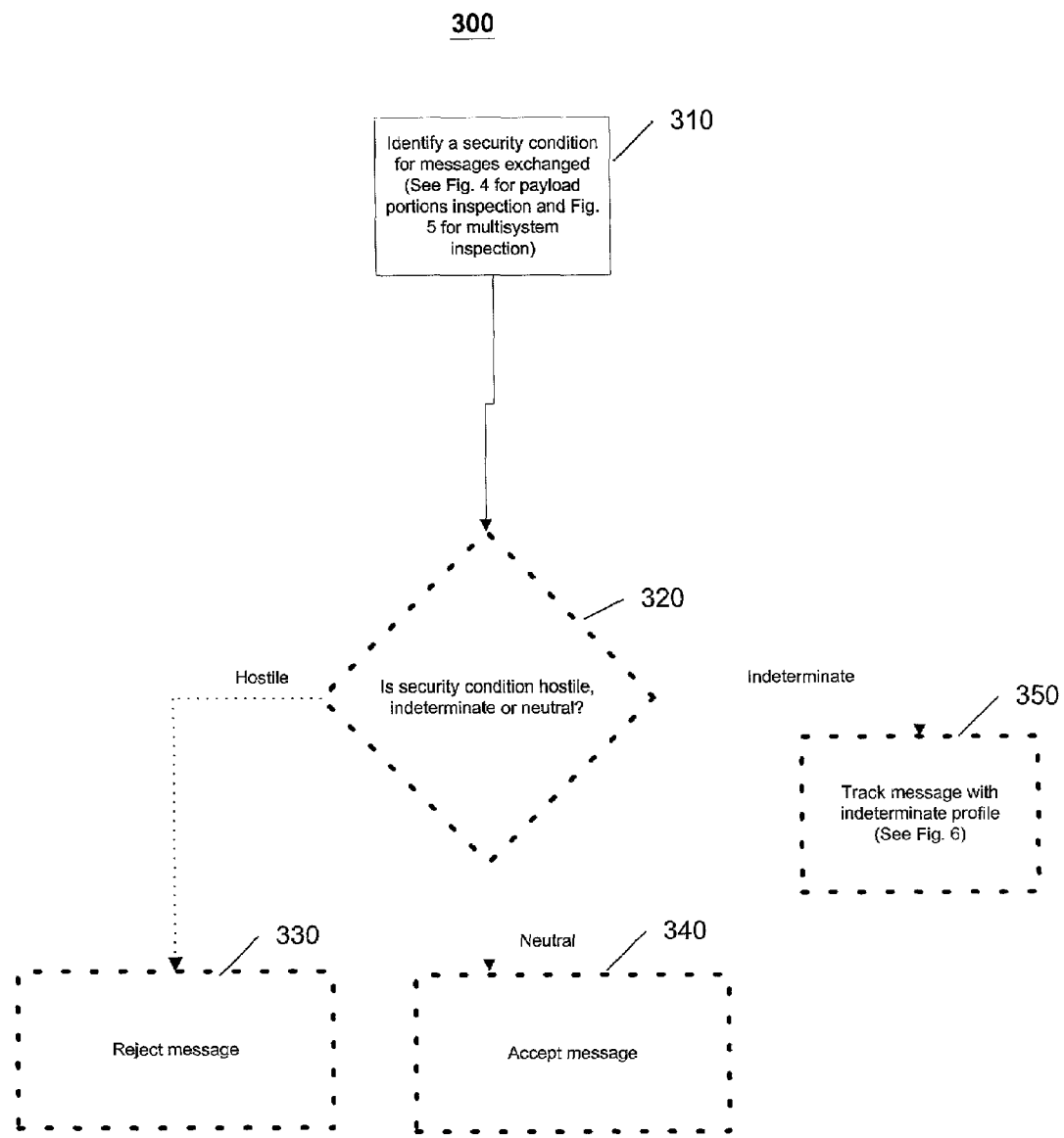
FIGS. 3-6 are flow charts illustrating steps performed in exchanging a message.

FIG. 3 illustrates a method of identifying unwanted messages in a message exchanging system, such as local exchanging system 130 described with reference to FIG. 1. Typically, an unwanted message may be identified by identifying a security condition for a message (step 310), determining whether the security condition is hostile, indeterminate or neutral (step 320), and taking an action based on the security condition identified (steps 330, 340 and 350).

Initially, a local exchanging system identifies a security condition for a message exchanged (step 310). Implementations may include systems that inspect the payload portion of a message. An example of operations performed by systems that inspect the payload portion are described further with respect to FIG. 4.

Implementations also may include systems that inspect both the header field and the payload portion. Such systems may be used where messages are exchanged across more than one local exchanging system.

Generally, identifying a security condition involves comparing one or more parameters appearing in a message with stored data indicating that the message may be hostile. The stored data generally indicate characteristics of at least one other message previously inspected.

The local exchanging system then determines whether the security condition is hostile, neutral, or indeterminate (step 320). A hostile security condition indicates that, based on parameters of the message, the message has a profile that resembles an unwanted message (e.g., spam, objectionable content) or a malicious message (e.g., viruses, worms).

A neutral security condition indicates that, based on the parameters of the message and based on the data presently stored, the message does not resemble messages considered to be unwanted or malicious.

An indeterminate condition indicates that, based on the parameters of the message, the message has a profile that is of concern and may subsequently be identified as a hostile message. For example, an exchanging system may receive a large number of messages from one source. After a threshold number of messages are exchanged, the message may be identified as a hostile message. Messages leading to the threshold number may initially generate a neutral, then an indeterminate indicator, before the threshold iteration of the message generates a hostile indicator.

If the message is hostile, the local exchanging system rejects the message (step 330). In the case of a message being transmitted, rejecting the message may include not transmitting the message. In the case of messages being received, storage and processing of rejected messages may be prevented, or to the extent that rejected messages are stored, an alarm may be generated and/or sent to an administrator.

The local exchanging system generally processes (e.g., transmit or receive) messages for which the security condition includes a neutral indicator indicating that the characteristics of the exchanged message correspond to those messages considered not hostile (step 340).

The local exchanging system also generally processes messages for which the security condition includes an indeterminate indicator, as this security condition indicates that the characteristics of the message do not correspond to a hostile condition at this time but may reveal a hostile indicator in the future in combination with other received messages having similar characteristics (step 350). As part of processing a message with an indeterminate indicator, the local exchanging system may index the message that has been processed to enable subsequent action to be taken if the message is recategorized. Similarly, characteristics may be counted to better categorize the message.

Figure 4:
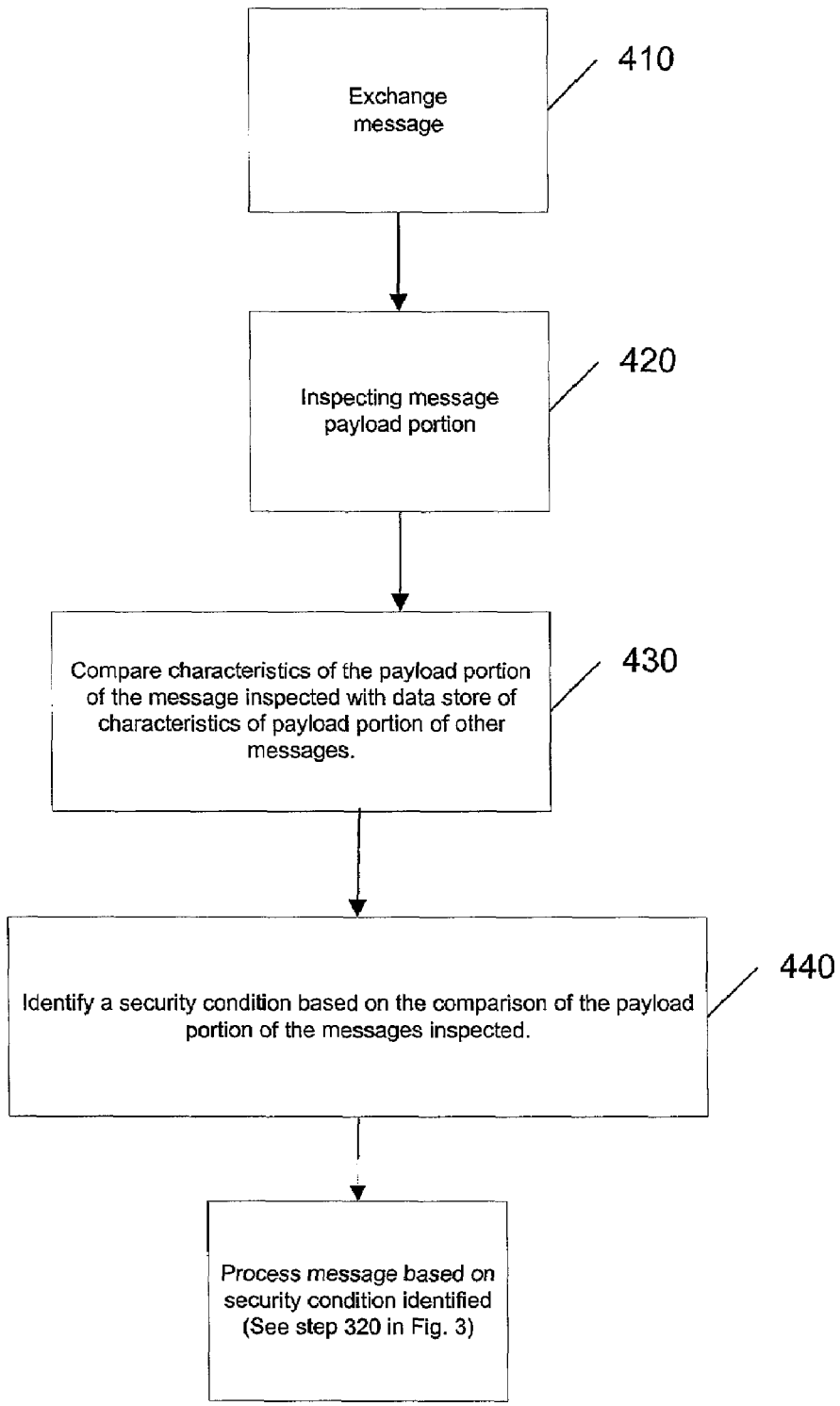

FIG. 4 illustrates a procedure 400 that represents one method of identifying a security condition by inspecting the payload portion of a message in a message exchanging system. Procedure 400 includes exchanging a message (step 410), inspecting the payload portion of the message (step 420), comparing the characteristics of the payload portion of the message with a data store of characteristics of other messages (step 430), and identifying a security condition based on the comparison of the characteristics (step 440). Typically, procedure 400 is performed by a message exchanging system, such as local exchanging system 130 of FIG. 1.

A message or file is exchanged between a sender and a receiver, such as remote exchanging system 110 and local exchanging system 130 (step 410). The message may include an electronic mail message and/or an instant message, and the message may be transmitted to or from a local exchanging system.

Next, in the implementation of FIG. 1, the inspection module 131 inspects the payload portion of the message exchanged (step 420). The payload portion generally corresponds to the payload portion of the message described previously in FIG. 2. Implementations may include inspecting more than one field in the payload portion. For example, the local exchanging system 130 may inspect the exchanged message to determine if the message includes hypertext links and/or attached documents. If the message includes a reference to information located outside the message, the external information being referenced also may be inspected. For example, in a message with a link to a file on a server, the local exchanging system may download and inspect the file.

The comparison module 132 compares the payload portion of the exchanged message, or characteristics thereof, with information from a data store 133 (step 430). This information may include the payload portion, or characteristics thereof, of other exchanged messages that have been inspected. Where the data store includes a database of the characteristics, the local exchanging system 130 may compare characteristics of the payload portion to those of other messages and add the compared characteristics to the data store. The data store then may be updated as additional messages are received. Other implementations may include having an administrator set parameters to inspect. For example, if an administrator learns in advance of a virus, the administrator may specify that all files with a suspect name or profile be entered into the data store of characteristics.

Comparing the characteristics may include comparing characteristics of an exchanged message with a subset of characteristics of other messages. For example, a local exchanging system may filter characteristics in the data store so that characteristics of an exchanged message are compared against the filtered subset of more suspect characteristics. The characteristics of the exchanged message may still be compiled into the data store. These characteristics may "bubble" into the filtered characteristics that are compared against if the characteristics continue to be received or are recategorized as more suspect.

In another implementation, the message may be compared against a data store corresponding to characteristics for messages exchanged locally. For example, a data store may correspond to messages exchanged on that system in a specified time span.

In the implementation of FIG. 1, the security module 134 determines a security condition based on the results of the comparison of the payload portion in the comparison module 132 (step 440).

Figure 5:
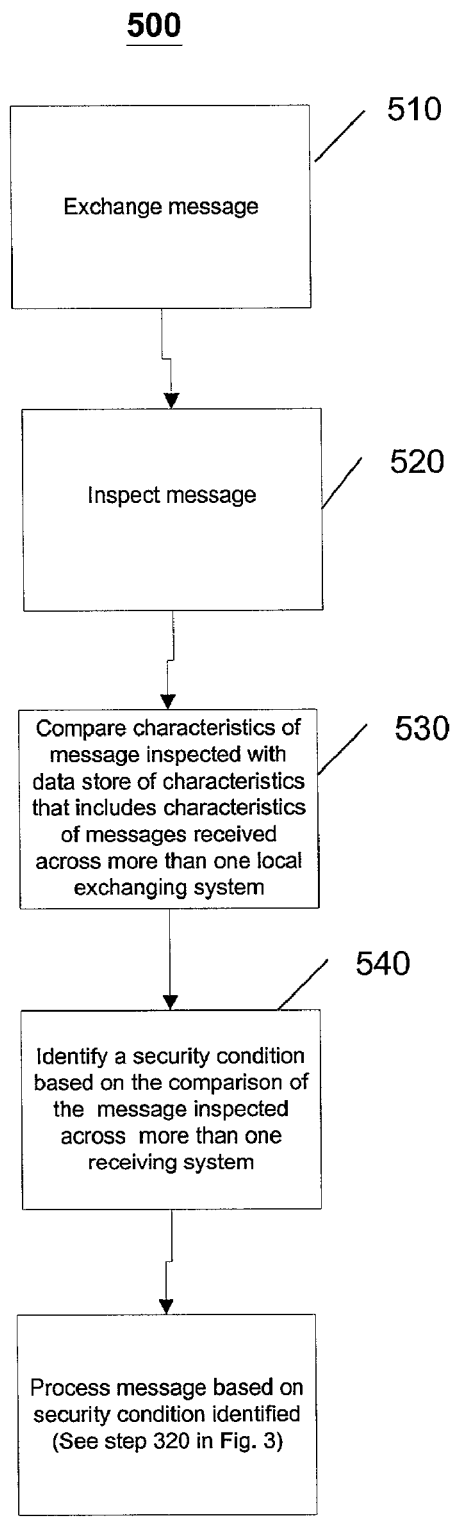

FIG. 5 illustrates a procedure 500 by which a security condition is identified by inspecting both the header field and the payload portion of messages being communicated in a local exchanging system that includes two or more devices. Procedure 500 involves exchanging a message (step 510), inspecting the message (step 520), comparing characteristics of the message with a data store of characteristics of other messages (step 530), and identifying a security condition based on the comparison (step 540). Typically, procedure 500 is performed on a message exchanging system, such as that illustrated by local exchanging system 130 of FIG. 1.

Initially, a message is exchanged (step 510) between a remote exchanging system and a local exchanging system, as is depicted in dashed lines in FIG. 1.

The exchanged message then is inspected (step 520) by examining parameters both in the header field and the payload portion. The local exchanging system then compares the message inspected with characteristics of messages exchanged across more than one local exchanging system 130 (step 530). The message exchanged across more than one local exchanging system 130 may be acquired in a synchronous or disparate manner. For example, the characteristics of messages compared may include characteristics of messages compiled from one server sending messages and another server receiving messages. The two or more local exchanging servers may be situated in geographically diverse locations. For example, one local exchanging server may be located on the east coast while the other is located on the west coast.

Comparing characteristics of messages (step 530) may include using a counter in conjunction with characteristics to determine a security condition. For example, a database may keep track of the number of times certain characteristics appear. As will be discussed, the counter may be a factor in determining the security condition.

The local exchanging system then identifies a security condition (step 540) based on the result of the comparison with messages exchanged across more than one local exchanging system. The security condition may include a hostile indicator.

Determining that there is a hostile indicator may include tracking the number of suspect elements in a message. A characteristic of the message is a suspect element when that characteristic is identified in the comparison against entries in the data store of characteristics 133. For example, if a Uniform Resource Locator ("URL") found in a message also exists in the data store of characteristics 133, that correlation may be identified as a suspect element that implicates the message as a suspect message.

Determining that there is a hostile indicator may include quantifying suspect elements. For example, two suspect elements may generate an indeterminate indicator while three suspect elements generate a hostile indicator.

In addition, or as an alternative, the security condition may be identified depending on the actual suspect element detected within the message. For example, messages with one particular suspect element H and no other elements of concern may always generate a hostile indicator while messages with a different single suspect element or a combination of other suspect elements may not generate a hostile indicator. Likewise, a message may include five suspect elements, but if one of the elements is a particular suspect element, the message may generate a neutral indicator. Examples may feature a hierarchy of suspect elements where one particular suspect element generates a neutral indicator unless another suspect element is present, in which case a hostile indicator is generated.

Implementations also may include having a suspect element generate an alarm score to gauge the level of concern. For example, a message may be inspected by identifying a sender, an attached file and a MD5 ("Message Digest 5") signature as elements of concern. The sender may receive a score of 10, the attached file may receive a score of 20, and the MD5 signature may generate a score of 30 for a combined message score of 60. If the local exchanging system categorizes all messages with a score greater than 100 as hostile, the message may be considered indeterminate or neutral. However, in some implementations, if one of the elements of concern is exchanged with increasing frequency, the score associated with that element of concern may increase. Thus, if the sender continues to appear in messages exchanged, perhaps indicating the sender may be sending "spam" mail messages, the score associated with that sender may rise to 90, generating a new alarm score of 140 for the same message previously assigned a score of 60. In some implementations, messages having alarm scores that subsequently increase above a specified threshold may be deleted in response to such an increase. For example, a local exchanging system may categorize a message as hostile initially if the score is above 100 and subsequently re-categorize as hostile any messages whose score rises above 130. In this case, the message is categorized with a hostile indicator upon review and the message is deleted. The local exchanging system may look up messages that were initially categorized with indeterminate indicators and subsequently re-categorized as hostile, and delete the re-categorized messages.

Determining a security condition also may include using neural networks to categorize and classify messages. The use of neural networks enables a local exchanging system to "learn" based on changing message patterns and conditions.

Implementations also may include tracking messages that include an indeterminate indicator. Generally, these implementations apply to situations where the local exchanging system has permissions over other systems, but are not limited to such situations. Implementations in which the remote system is operated by a different entity may employ a protocol to allow the tracking of messages between the entities. For example, messages A, B and C each include characteristic Z, which may generate a hostile indicator if the characteristic Z occurs above a threshold number of times. The local exchanging system 130 may store messages A, B, and C, but will track the addresses at which the messages are located. If the local exchanging system 130 exchanges message D with characteristic Z, and the threshold number of times for characteristic Z to generate a hostile indicator is four or more times, then the local exchanging system 130 may reject message D. The local exchanging system 130 also may delete messages A, B, and C in response to the threshold having been reached, even after initially processing them.

Figure 6:
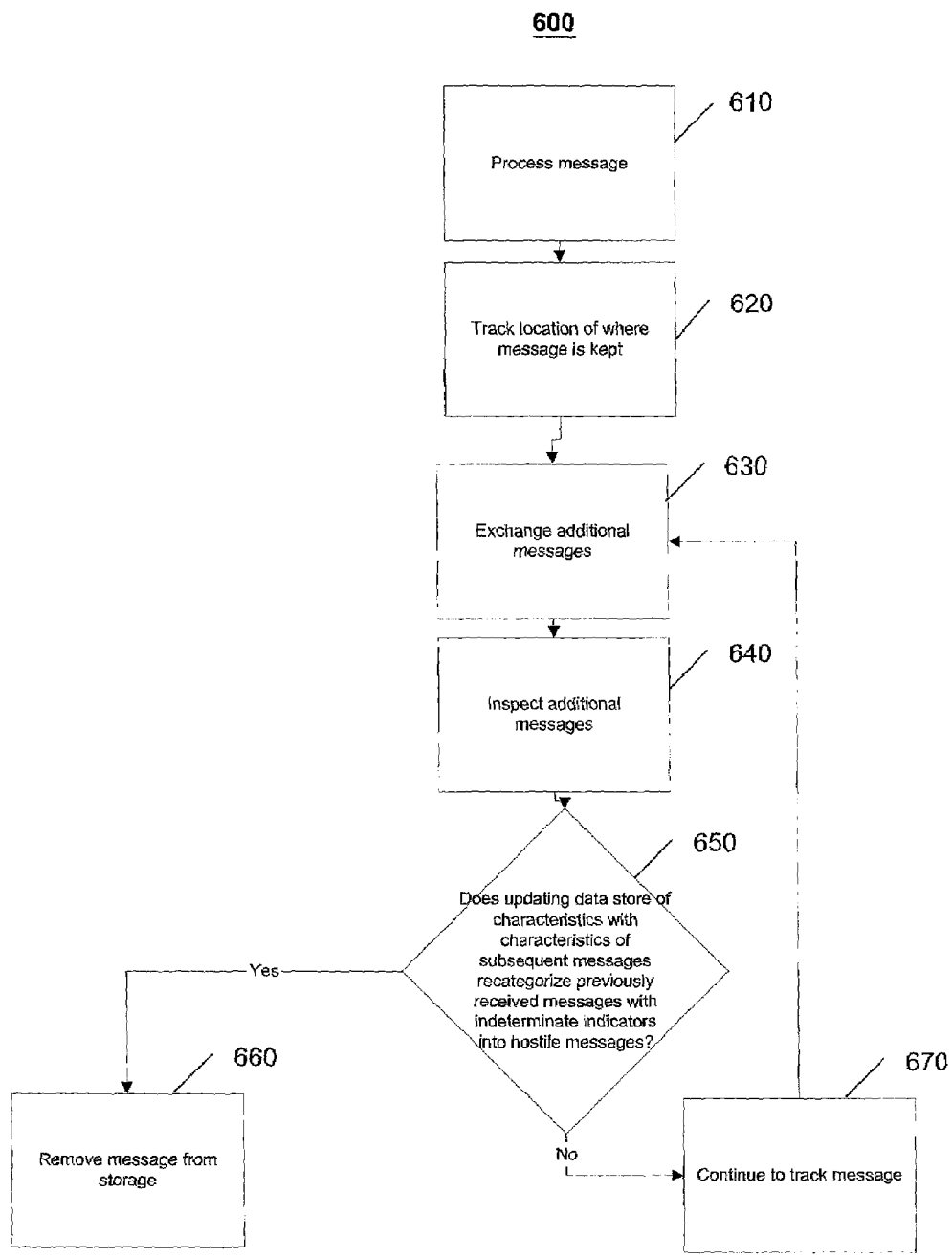

FIG. 6 illustrates a procedure 600 by which a message with an indeterminate indicator is tracked, as was described generally in step 350 of FIG. 3. The implementations used to identify the security condition may include, but are not limited to, the steps described with respect to FIGS. 4 and 5. Procedure 600 is typically performed on a message exchanging system, such as local exchanging system 130 of FIG. 1.

Initially, an exchanged message with an indeterminate indicator is processed (step 610). This generally includes transmitting a message or storing a received message.

With the message processed, the local exchanging system tracks the location of where the message is kept (step 620). Typically, this will include having a message exchanging system track the location of a message. However, implementations may include having the local exchanging system receive a location of the message from a remote exchanging system indicating where the message is kept. Other implementations of tracking the message may include tracking an instance of the message being stored in an "outbox" of sent messages on a local exchanging system. The location of this message also may be provided.

The local exchanging system exchanges additional messages (step 630). As these additional messages are exchanged, the additional messages are inspected (step 640). Inspecting the additional messages includes examining the subsequently received messages to determine whether they are unwanted (e.g., FIGS. 3-5) and updating the data store of characteristics.

The local exchanging system determines whether updating the data store of characteristics with characteristics of messages subsequently exchanged recategorizes a message previously categorized with an indeterminate indicator into a message with a hostile indicator (step 650). If so, the message is removed from storage (step 660). In cases where the message was transmitted, the local exchanging system may generate a message, alarm or indicator to the remote exchanging system that the message is now considered to have a hostile indicator. If the message has not been recategorized, the local exchanging system continues to track the message (step 670).

Implementations also may include recategorizing messages with indeterminate indicators into neutral indicators if subsequently exchanged messages indicate that the message is valid. For example, a valid message sender may send valid electronic mail to a large number of recipients, such that the number of recipients happens to be more than the threshold required to generate an indeterminate indicator. In another example, a system administrator who receives an alarm about a particular profile in a message may examine the message and determine that the message is acceptable to be stored.

The message exchanging system, methods, devices and programs may be implemented in hardware or software, or a combination of both. In some implementations, the message exchanging system, methods, devices and programs are implemented in computer programs executing on programmable computers each with at least one processor, a data storage system (including volatile and/or storage elements), at least one input device, and at least one output device. Program code is applied to input data to perform the functions described herein and generate output information. The output information is applied to one or more output devices.

A number of implementations have been described. Nevertheless, it will be understood that various modifications may be made.

What is claimed is:

1. A method of identifying unwanted messages, the method comprising:
    inspecting a payload portion of an electronic mail message being communicated and identifying characteristics of the payload portion, the electronic mail message including an address of a recipient;
    comparing the characteristics of the inspeceted payload portion of the electronic mail message with stored data indicating characterisitics of at least one other electronic mail message that has been inspected;
    based on comparison results, identifying a first security condition for the electronic mail message from among at least one of acceptable, unacceptable, and indeterminate states; and
    processing the electronic mail message based on the first security condition, wherein processing, the electronic mail message includes:
        rejecting the electronic mail message if the first security condition associated with the electronic mail message reflects the unacceptable state;
        accepting the electronic mail message if the first security condition associated with the electronic mail message reflects the acceptable state; and
        if the first security condition associated with the electronic mail message reflects the indeterminate state, monitoring the electronic mail message by:
            transmitting the electronic mail message based on the address of the electronic mail message;
            tracking a location of the transmitted electronic mail message;
            inspecting at least one other electronic mail message subsequent to transmitting the electronic mail message;
            updating the stored data to indicate characteristics of the at least one other electronic mail message that has been inspected;
            recategorizing the first security condition of the transmitted electronic mail message to a second security condition of the transmitted electronic mail message based on the updated stored data; and
            reprocessing the transmitted electronic mail message based on the second security condition, wherein reprocessing the transmitted electronic mail message includes deleting the transmitted electronic mail message if the second security condition reflects the unacceptable state.

2. The method of claim 1 wherein the characteristics of the payload portion include information other than address information.

3. The method of claim 2 wherein the characteristics of the payload portion do not include address information.

4. The method of claim 1 wherein a security condition associated with an electronic mail message is identified as reflecting the unacceptable state when the comparison of the characteristics reveals a threshold number of messages having a shared characteristic.

5. The method of claim 4 wherein reprocessing the transmitted electronic mail message based on the second security condition includes deleting the transmitted electronic mail message if the security condition associated with the at least one other electronic mail message inspected subsequent to the transmitting the electronic mail message is identified as reflecting the unacceptable state and the at least one other electronic mail message has characteristics in common with the transmitted electronic mail message.

6. The method of claim 1 further comprising tracking the characteristics of the payload portion for comparison against characteristics of future electronic mail messages, wherein the characteristics of a new electronic mail message are compared with the characteristics of at least one electronic mail message that has been tracked.

7. The method of claim 6 wherein comparing the characteristics of the payload portion includes comparing the characteristics of the payload portion of electronic mail messages inspected with stored characteristics of other communicated electronic mail messages.

8. The method of claim 6 wherein the characteristics of the payload portion of the electronic mail message are tracked when the first security condition is indentified as reflecting the indeterminate state.

9. The method of claim 8 wherein an indeterminate state is identified if the comparison of the characteristics does not itself reveal an unacceptable state, but the characteristics of the payload portion would reveal the unacceptable state in combination with similar characteristics of other electronic mail messages.

10. The method of claim 8 further comprising accepting the transmitted electronic mail message if the second security condition associated with the transmitted electronic mail message reflects the acceptable state.

11. The method of claim 1 wherein identifying the first security condition includes comparing the characteristics of more than one electronic mail message received by a single device.

12. The method of claim 1 wherein identifying the first security condition includes comparing the characteristics of more than one electronic mail message sent by a single device.

13. The method of claim 1 wherein recategorizing the first security condition of the transmitted electronic mail message to a second security condition of the transmitted electronic mail message includes recategorizing the first security condition of the transmitted electronic mail message to second security condition that reflects the unacceptable state.

14. The method of claim 1 wherein recategorizing the first security condition of the transmitted electronic mail message to a second security condition of the transmitted electronic mail message includes recategorizing the first security condition of the transmitted electronic mail message to a second security condition that reflects the unacceptable state.

15. The method of claim 1 wherein identifying the first security condition as reflecting the acceptable state includes identifying the first security condition as reflecting a neutral state.

16. The method of claim 1 wherein identifying the first security condition as reflecting the unacceptable state includes identifying the first security condition as reflecting a hostile state.

17. The method of claim 1 wherein recategorizing the first security condition of the transmitted electronic mail message is performed when the stored data is updated such that the security condition associated with an electronic mail message with certain characteristics would be identified as reflecting a state other than the indeterminate state and the security condition associated with an electronic mail message with the same characteristics would have been identified as reflecting the indeterminate state prior to the update.

18. The method of claim 1 wherein recategorizing the first security condition of the transmitted electronic mail message is performed if at least one other electronic mail message inspected subsequent to transmitting the electronic mail message includes a characteristic that increases the number of electronic mail messages inspected with that characteristic above a threshold level.

19. The method of claim 1 wherein recategorizing the first security condition of the transmitted electronic mail message is performed when an administrator updates the stored data to indicate that at least one characteristic of an electronic mail message is acceptable.

20. The method of claim 1 wherein recategorizing the first security condition of the transmitted electronic mail message is performed when an administrator updates the stored data to indicate that at least one characteristic of an electronic mail message is unacceptable.

21. The method of claim 1 wherein reprocessing the transmitted electronic mail message includes removing the transmitted electronic mail message from storage if the second security condition reflects the unacceptable state.

22. The method of claim 1 wherein reprocessing the transmitted electronic mail message includes generating an alarm if the second security condition reflects the unacceptable state.

23. The method of claim 1 wherein reprocessing the transmitted electronic mail message includes continuing to track the location of the transmitted electronic mail message if the second security condition still reflects the indeterminate state.

24. The method of claim 1 wherein recategorizing the first security condition of the transmitted electronic mail message includes:
   accessing the location of the electronic mail message;
   retrieving the electronic mail message from the location;
   inspecting the payload portion of the transmitted electronic mail message and identifying characteristics of the payload portion;
   comparing the characteristics of the payload portion of the transmitted electronic mail message with the updated stored data; and
   in response to comparing, identifying the second security condition from among at least one of the acceptable, unacceptable, and indeterminate states.

25. At least one storage medium storing one or more computer programs, the one or more computer programs including instructions that, when executed, perform operations comprising:
   inspecting a payload portion of an electronic mail message being communicated and identifying characteristics of the payload portion, the electronic mail message including an address of a recipient;
   comparing the characteristics of the inspected payload portion of the electronic mail message with stored data indicating characteristics of at least one other electronic mail message that has been inspected;
   based on comparison results, identifying a first security condition for the electronic mail message from among at least one of acceptable, unacceptable and indeterminate states; and
   processing the electronic mail message based on the first security condition, wherein processing the electronic mail message includes:
      rejecting the electronic mail message if the first security condition associated with the electronic mail message reflects the unacceptable state;
      accepting the electronic mail message if the first security condition associated with the electronic mail message reflects the acceptable state; and
      if the first security condition associated with the electronic mail message reflects the indeterminate state, monitoring the electronic mail message by:
         transmitting the electronic mail message based on the address of the electronic mail message;
         tracking a location of the transmitted electronic mail message;
         inspecting at least one other electronic mail message subsequent to transmitting the electronic mail message;
         updating the stored data to indicate characteristics of the at least one other electronic mail message that has been inspected;
         recategorizing the first security condition of the transmitted electronic mail message to a second security condition of the transmitted electronic mail message based on the updated stored data; and reprocessing the transmitted electronic mail message based on the second security condition, wherein reprocessing the transmitted electronic mail message includes deleting the transmitted electronic mail message if the second security condition reflects the unacceptable state.

26. An electronic system comprising:

at least one storage element configured to store data indicating characteristics of electronic mail messages; and at least one processor configured to execute instructions, stored on the at least one storage element, to perform operations comprising:

inspecting a payload portion of an electronic mail message being communicated and identifying characteristics of the payload portion, the electronic mail message including an address of a recipient;

comparing the characteristics of the inspected payload portion of the electronic mail message with stored data indicating characteristics of at least one other electronic mail message that has been inspected;

based on comparison results, identifying a first security condition for the electronic mail message from among at least one of acceptable, unacceptable, and indeterminate states; and processing the electronic mail message based on the first security condition, wherein processing the electronic mail message includes:

rejecting the electronic mail message if the first security condition associated with the electronic mail message reflects the unacceptable state;

accepting the electronic mail message if the first security condition associated with the electronic mail message reflects the acceptable state; and if the first security condition associated with the electronic mail message reflects the indeterminate state, monitoring the electronic mail message by:

transmitting the electronic mail message based on the address of the electronic mail message;

tracking a location of the transmitted electronic mail message;

inspecting at least one other electronic, mail message subsequent to transmitting the electronic mail message;

updating the stored data to indicate characteristics of the at least one other electronic mail message that has been inspected;

recategorizing the first security condition of the transmitted electronic mail message to a second security condition of the transmitted electronic mail message based on the updated stored data; and reprocessing the transmitted electronic mail message based on the second security condition, wherein reprocessing the transmitted electronic mail message includes deleting the transmitted electronic mail message if the second security condition reflects the unacceptable state.

27. Art electronic system comprising:

means for inspecting a payload portion of an electronic mail message being communicated and identifying characteristics of the payload portion, the electronic mail message including an address of a recipient;

means for comparing the characteristics of the inspected payload portion of the electronic mail message with stored data indicating characteristics of at least one other electronic mail message that has been inspected;

means for, based on comparison results, identifying a first security condition for the electronic mail message from among at least one of acceptable, unacceptable, and indeterminate states; and means for processing the electronic mail message based on the first security condition, wherein the means for processing the electronic mail message includes:

means for rejecting the electronic mail message if the first security condition associated with the electronic mail message reflects the unacceptable state;

means for accepting the electronic mail message if the first security condition associated with the electronic mail message reflects the acceptable state; and means for, if the first security condition associated with the electronic mail message reflects the indeterminate state, monitoring the electronic mail message by:

transmitting the electronic mail message based on the address of the electronic mail message;

tracking a location of the transmitted electronic mail message;

inspecting at least one other electronic mail message subsequent to transmitting the electronic mail message;

updating the stored data to indicate characteristics of the at least one other electronic mail message that has been inspected;

recategorizing the first security condition of the transmitted electronic mail message to a second security condition of the transmitted electronic mail message based on the updated stored data; and reprocessing the transmitted electronic mail message based on the second security condition, wherein reprocessing the transmitted electronic mail message includes deleting the transmitted electronic mail message if the second security condition reflects the unacceptable state.

* * * * *